May 26, 1931.  W. BREHMER  1,807,469
SPRAYING MACHINE
Filed May 6. 1930   2 Sheets-Sheet 1

INVENTOR.
William Brehmer

BY *Lancaster, Allwine & Rommel*
ATTORNEYS

May 26, 1931.      W. BREHMER      1,807,469
SPRAYING MACHINE
Filed May 6, 1930      2 Sheets-Sheet 2

INVENTOR.
William Brehmer

BY Lancaster, Allwine and Rommel
ATTORNEYS.

Patented May 26, 1931

1,807,469

UNITED STATES PATENT OFFICE

WILLIAM BREHMER, OF SAN ANTONIO, TEXAS

SPRAYING MACHINE

Application filed May 6, 1930. Serial No. 450,259.

The present invention relates to spraying machines and the primary object of the invention is to provide an improved machine for spraying rows of plants with a poisonous liquid for exterminating insects which are injurious to the plants.

A further object of the invention is to provide a spraying machine which is especially well adapted for combating boll weevil in cotton fields, but which will be found equally well adapted for use in treating various other types of plants.

A further object of the invention is to provide an improved spraying machine embodying a novel arrangement whereby the plants are thoroughly sprayed adjacent the stalks and along the branches of the plants, as well as beneath the leaves of the plants.

A further object of the invention is to provide a wheeled spraying machine for treating rows of plants embodying an arrangement whereby the plants are first gathered and when being allowed to return to their original positions are subjected to a spray of poisonous liquid.

A further object resides in the novel construction of the machine whereby the plants are disturbed causing some of the insects to fall directly beneath the plants where they are subjected to the poisonous spray being directed against the base of the plants.

Other objects and advantages of the invention will be apparent during the course of the following detailed description, taken in connection with the accompanying drawings forming a part of this specification and in which drawings.

Figure 1:
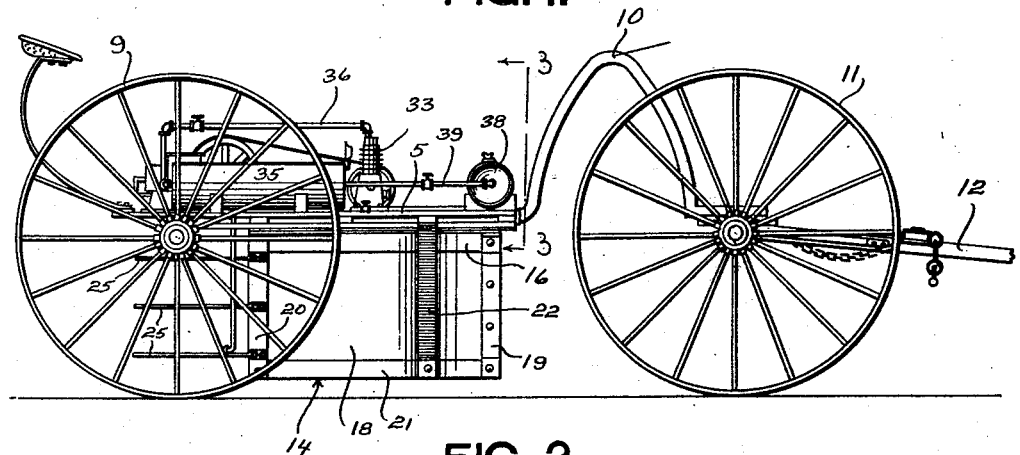
Figure 1 is a side elevation of the improved spraying machine.

In the drawings, and wherein similar reference characters designate corresponding parts thruout the several views, the improved spraying machine for treating rows of plants with a poisonous liquid spray embodies a flat, substantially rectangular-shaped platform 5 provided at its under side with suitable transverse braces 6 and a main longitudinal beam 7 arranged at the longitudinal center of the platform. Secured along the rearmost transverse brace 6 is an axle 8 upon the ends of which are mounted rear ground engaging wheels 9. Connected with the forward end of the center beam 7 is an arch beam or yoke 10 which at its forward end is supported upon an axle for a pair of front supporting wheels 11. The axle for the front or steering wheels 11 may be connected by a suitable pivot pin or fifth wheel to the forward end of the arch 10 to permit steering of the machine and in the example shown the machine may be animal drawn and is provided with the tongue 12. The machine may be power propelled if so desired.

A pair of diagonal braces 13 may also be extended across the transverse braces 6 to extend from the ends of the rear axle supporting brace in forwardly converging relation to the point of attachment of the yoke 10.

Mounted upon the under side of the horizontally supported platform 5 and at the longitudinal center thereof directly beneath the center beam 7 is an elongated plant gathering chute 14 of substantially inverted U-formation. This plant gathering chute 14 extends from the forward end of the platform to a point slightly forward of the rear axle 8. This inverted chute 14 embodies a flat top plate 15 secured to the under side of the transverse braces 6. The forward end of the plate 15 flares outwardly as clearly shown in Figure 2. Secured along each side edge of the top plate 15 and conforming to the shape of the side edges of the plate is an angle-shaped hanger strip 16. Secured along its upper edge to the inner side of the depending flange of each hanger strip 16 is a gathering plate 18. The forward end portions of the plates 18 extend in diverging relation to one another so as to form a funnel-like forward end for the gathering chute. The rear ends of the depending gathering plates 18 are also slightly divergent to one another but to a less degree than the forward divergent ends of the plates. The gathering plates 18 may be formed of any suitable light material such as sheet metal or the like and preferably stiffened along their front and rear vertical end edges by stiffening strips 19 and 20 respectively and along their lower edges by suitable stiffening strips 21. These edge stiffening strips 19, 20 and 21 as will be observed are secured to the outer or opposed sides of the gathering plates so that the inner walls of the gathering chute are free of obstruction such as would tend to injure plants over which the machine is moving.

Each gathering plate 18 is braced adjacent its forward end by a depending brace 22 extending from the outer end of one of the transverse braces 6 to the lower edges of the plates. These braces 22 are arranged at the forward end of the constricted portion of the gathering chute and prevents outward yielding of the gathering plates when the plants are being moved therebetween.

Provided at the rear end of each gathering plate 18 is a fork structure embodying a series of rearwardly directed prongs or tines 25 between which the plants are received at the rear end of the solid walled chute 14. Any suitable number of these prongs or tines 25 may be provided for each gathering plate and the forward end of each tine is formed with an elongated eye 26 for attachment of the tines to the rear stiffening strips 20 as by means of bolts or other suitable fastening elements 27 extended thru each end of the eye so as to retain the tines in a horizontal position. Immediately rearwardly of the eyes 26 the tines are offset outwardly as at 28 with the shank portions 30 extending substantially parallel with and offset outwardly from the gathering plates. As will be observed in Figure 2 the shank portions of the tines carried by one gathering plate extend parallel to the shank portions of the tines carried by the companion gathering plate with the spacing between the sets of tines greater than the distance between the constricted portion of the gathering chute. As will be observed in Figure 1, the tines 25 are arranged in parallel spaced apart relation above one another along the rear ends of the gathering plates. As the machine is moved forwardly over a row of plants, the plants will be gathered into the flaring forward end of the gathering chute and directed rearwardly between the plates 18 to the rear ends of the plates where the plants will be permitted to spread to some extent between the forks.

Mounted upon the upper side of the platform 5 is any suitable type of power plant such as an internal combustion engine 32 adapted to operate a suitable compressor 33 by a drive coupling 34. Mounted upon the platform at one side of the engine 32 is an air pressure tank 35 connected by a pipe line 36 with the compressor 33. A control valve 37 is provided in the pipe line 36 for controlling passage of air from the compressor 33 to the air storage tank 35.

Mounted upon the forward portion of the platform 5 is a liquid tank 38 for containing a liquid insecticide. The tanks 35 and 38 are connected by an air line 39 in which is provided a control valve 40 for controlling passage of air under pressure from the tank 35 to the liquid tank 38 whereby a head pressure is maintained upon the liquid in the tank.

Figure 2:
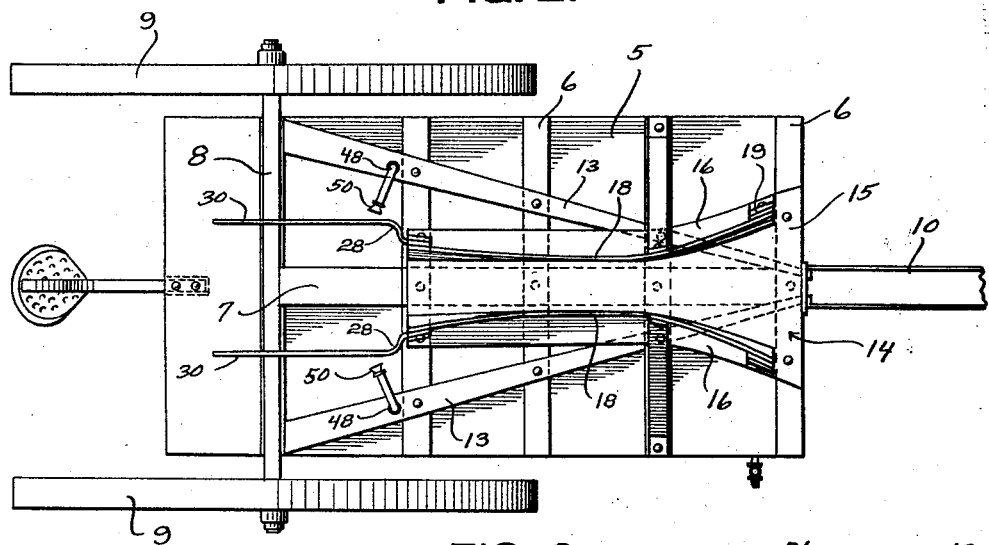
Figure 2 is an enlarged fragmentary bottom plan view of the machine.
Figure 6:
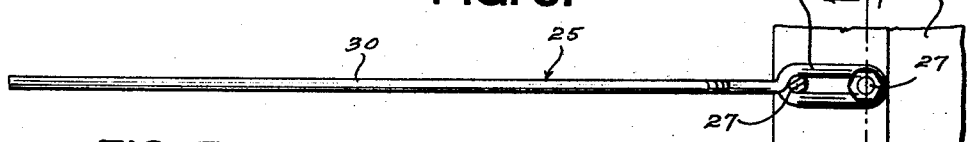
Figure 6 is an enlarged fragmentary view showing one of the tines for permitting partial return of the plants to their original positions during the time the plants are subjected to the spray.
Figure 7:
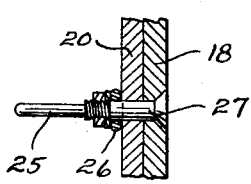
Figure 7 is a fragmentary section on line 7—7 of Figure 6.
Figure 3:
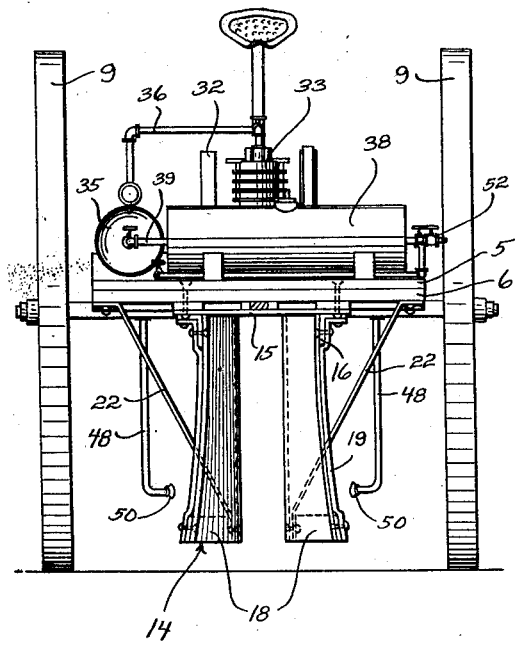
Figure 3 is an enlarged section looking rearwardly at the point 3—3 of Figure 1.
Figure 4:
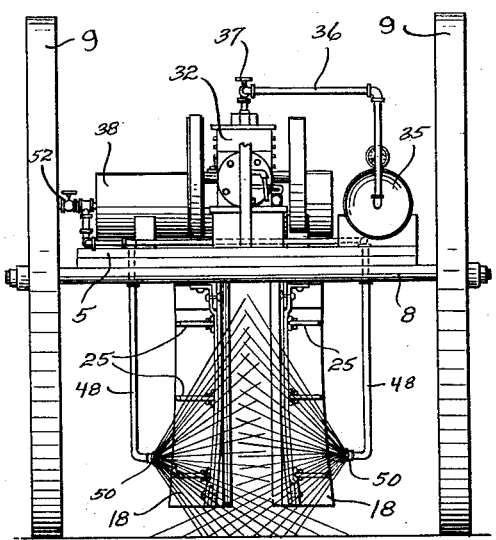
Figure 4 is a view looking at the rear end of the machine.
Figure 5:
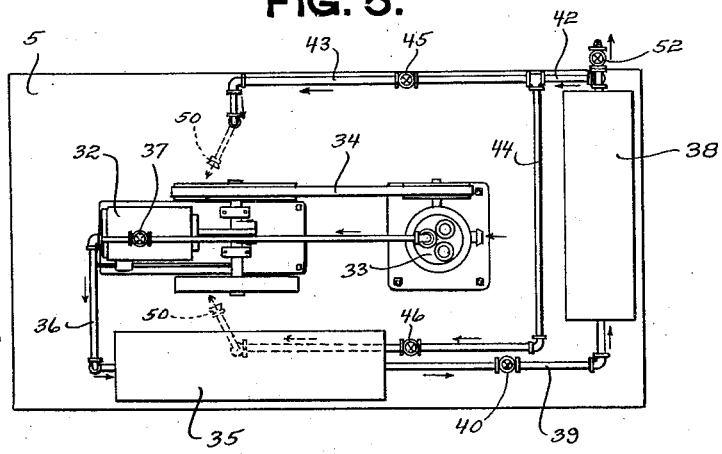
Figure 5 is a top plan view of the platform structure and showing the arrangement of mounting the apparatus thereon.

Connected into the liquid tank 38 is a feed line 42 provided with the branch feed lines 43 and 44 having the control valves 45 and 46 respectively. These branch feed lines 43 and 44 are led over the upper side of the platform 5 and are connected to the upper ends of spray pipes 48 which extend downwardly thru the platform at opposite sides of the furcated rear end of the gathering chute 14. These depending spray pipes 48 have their lower ends directed toward the longitudinal center of the machine and are provided with suitable spray heads or nozzles 50 adapted to direct the liquid spray thru the tines 25 and also upon a portion of the ground as indicated in Figure 4. The spray heads 50 may be adjustable if so desired and as will be observed in Figure 2, are spaced slightly outwardly of the tines 25 so as to not come in contact with the foliage of the plant being moved between the tines.

A control valve 52 is attached to the feed line 42 whereby a hose or the like may be connected with the liquid tank 38 for spraying trees and at which time the valves 45 and 46 will be shut off.

In operation of the spraying machine and as the machine is moved along a row of plants, the elongated gathering plate 14 rides over the plant and gathers the top portion of the plant so that the plant is guided rearwardly between the depending plates 18. This movement of the plant thru the chute dislodges a number of the insects and as the plants emerge from the rear end of the chute the plants will partially expand to their original positions between the rearwardly directed forks and as expanding will be subjected at both sides to the spray of the insecticide. This expanding of the plants will change the positions of the leaves, permitting the spray to reach under the leaves and also against the stalk and branches of the plants. The quick expansion of the plants at the rear end of the gathering plates will also act to dislodge the insects and subject them to the spray which is also directed upon the ground and upon any insects which have been dislodged by the gathering plates.

From the foregoing description it will be apparent that a novel and improved spraying machine has been provided embodying a novel arrangement whereby the plants are first gathered and when permitted to expand to their original positions are subjected at both sides to a liquid spray. It will also be observed that the tines 25 hold the plants at a set distance from the spray nozzles so that the spray may be effectively directed against the plants.

Changes in detail may be made to the form of invention herein shown and described, without departing from the spirit of the invention or the scope of the following claims.

I claim:

1. In a machine of the character described, a wheeled platform, a gathering chute depending from the platform for straddling a row of plants and having a furcated rear end, and spray nozzles arranged at each side of the furcated rear end of the chute and directed toward one another for discharging through the furciformed end of the chute.

2. A spraying machine comprising a platform, ground engaging wheels supporting the platform, an elongated gathering chute supported longitudinally beneath the platform, said chute embodying side walls having furcated rear ends, spray heads arranged outwardly of the furcated rear ends of the walls for discharging through said ends, and liquid supply means for the spray nozzles.

3. In a spraying machine, a wheeled platform, an elongated gathering chute arranged beneath the platform embodying a pair of gathering plates forming a flaring forward end for the chute, rearwardly directed forks at the rear end of each gathering plate, a liquid supply means, and spray heads arranged at the outer side of the forks and connected with the liquid supply means for discharging a spray through the forks.

4. In a spraying machine, a wheeled platform, a gathering chute supported beneath the platform embodying a pair of gathering plates forming a restricted way for gathering together plants passing therethru, a fork provided at the rear end of each gathering plate each embodying rearwardly directed tines offset outwardly from the plate, a spray nozzle arranged outwardly of each fork and directed toward the forks, and means for supplying an insecticide to the spray nozzles.

5. In a spraying machine, a wheeled platform, a pair of gathering plates arranged in spaced relation beneath the platform and having their forward ends arranged in diverging relation, a series of tines extending rearwardly from the rear end of each plate and offset outwardly from the plate, a liquid supply means on the platform, and spray heads arranged outwardly of each set of tines and connected with the liquid supply means for directing spray thru the tines and upon the sides of plants moved between the tines.

6. In a spraying machine, a wheeled platform, an elongated gathering chute hung longitudinally beneath the platform embodying a pair of spaced gathering plates, a series of rearwardly directed tines carried by the rear end portion of each plate and offset outwardly therefrom, and spraying means embodying spray nozzles arranged outwardly of each set of tines and directed toward one another whereby the spray is directed upon the sides of plants being moved thru the chute and between the tines.

7. In a spraying machine, a wheeled platform, an elongated plant gathering chute hung longitudinally beneath the platform and embodying a pair of spaced apart gathering plates having divergent forward ends, a fork at the rear end of each plate each embodying a series of tines directed rearwardly from the plates and offset outwardly therefrom with the tines of one fork extending parallel with the tines of the companion fork, and a liquid spraying nozzle arranged outwardly of each fork and directed there toward, said nozzles being arranged to have a portion of the spray strike upon the ground in a line with the longitudinal center of the chute.

8. In a spraying machine, a wheeled platform, an elongated plant gathering chute hung longitudinally beneath the platform and embodying a pair of spaced apart gathering plates having divergent forward ends, a fork at the rear end of each plate each embodying a series of tines directed rearwardly from the plates and offset outwardly therefrom with the tines of one fork extending parallel with the tines of the companion fork, liquid supply means on the platform, a spray pipe depending from the platform outwardly of and adjacent the rear end of each gathering plate, and a spray head connected with the lower end of each spray pipe and directed toward the forks at the forward ends thereof for directing sprays upon each side of the plants as the plants emerge from the rear ends of the gathering plates.

9. In a spraying machine, a wheeled platform, an elongated gathering chute supported longitudinally beneath the platform embodying a pair of gathering plates for gathering the plants together, a series of tines connected to the rear end of each plate, said tines each embodying a straight rearwardly directed shank portion offset outwardly at an abrupt angle at its forward end of attachment to the plates, liquid supply means on the platform, means for maintaining the liquid under pressure, spray pipes connected with the liquid supply means and depending from the platform at the rear end of each gathering plate, and a spray head connected with the lower end of each spray pipe, said spray heads being arranged to direct the spray between the tines and upon opposite sides of plants moving between the tines.

10. In a spraying machine, a wheeled platform, an elongated gathering chute supported longitudinally beneath the platform embodying a pair of gathering plates adapted for movement along the opposite sides of a row of plants, said plates having their forward end portions arranged in diverging relation, a series of rearwardly directed tines secured to the rear end of each plate and spaced apart a greater distance than the spacing between the rear end portions of the plates, a spray nozzle arranged outwardly of each set of tines for discharging thru the tines, and means for supplying liquid under pressure to the spray nozzles.

11. In a spraying machine, a gathering chute embodying a top plate and a pair of depending gathering plates secured at their upper edges to the side edges of the top plate, said gathering plates being reinforced along their front, rear and bottom edges and having their forward end portions extending in diverging relation, a series of tines mounted in vertically spaced relation at the rear end of each gathering plate and each embodying a straight rearwardly directed shank portion offset outwardly from the rear ends of the plates, and spray nozzles outwardly of each series of tines and directed to discharge through the tines.

WILLIAM BREHMER.